US008058843B2

(12) United States Patent
Altman

(10) Patent No.: US 8,058,843 B2
(45) Date of Patent: Nov. 15, 2011

(54) ASYMMETRIC BATTERY PULSATION SYSTEM

(75) Inventor: Roger Altman, Alexandria Bay, NY (US)

(73) Assignee: Canadus Power Systems, LLC, Warrensville Heights, OH (US)

( * ) Notice: Subject to any disclaimer, the term of this patent is extended or adjusted under 35 U.S.C. 154(b) by 757 days.

(21) Appl. No.: 12/193,996

(22) Filed: Aug. 19, 2008

(65) Prior Publication Data

US 2010/0045235 A1     Feb. 25, 2010

(51) Int. Cl.
*H01M 10/46* (2006.01)
(52) U.S. Cl. ......................................... 320/116; 320/139
(58) Field of Classification Search .................. 320/107, 320/112, 116, 137, 139, 141, 145, 160, 162
See application file for complete search history.

(56) References Cited

U.S. PATENT DOCUMENTS

| | | | | |
|---|---|---|---|---|
| 5,633,575 A | * | 5/1997 | Gali | 320/140 |
| 5,648,714 A | | 7/1997 | Eryou et al. | |
| 5,670,863 A | * | 9/1997 | Broell et al. | 320/145 |
| 6,232,750 B1 | * | 5/2001 | Podrazhansky et al. | 320/139 |
| 6,522,102 B1 | * | 2/2003 | Cheiky et al. | 320/125 |
| 7,474,078 B2 | * | 1/2009 | Baker | 320/134 |
| 7,535,202 B2 | * | 5/2009 | Altman | 320/139 |
| 2003/0094927 A1 | * | 5/2003 | Pavlovic et al. | 320/162 |

* cited by examiner

*Primary Examiner* — Edward Tso
(74) *Attorney, Agent, or Firm* — Thompson Hine LLP

(57) ABSTRACT

A battery pulsation system including a battery string including a plurality of cells, the battery string defining a positive end and a negative end, a first pulsation device connected to a first cell of the battery string to supply a first pulsation energy thereto, the first cell includes a first positive terminal and a first negative terminal and is generally adjacent to the positive end of the battery string, wherein the first pulsation device applies a greater portion of the first pulsation energy to the first negative terminal than the first positive terminal, and a second pulsation device connected to a second cell of the battery string to supply a second pulsation energy thereto, the second cell includes a second positive terminal and a second negative terminal and is generally adjacent to the negative end of the battery string, wherein the second pulsation device applies a greater portion of the second pulsation energy to the second positive terminal than the second negative terminal.

22 Claims, 3 Drawing Sheets

ASYMMETRIC BATTERY PULSATION SYSTEM

BACKGROUND

The present patent application is directed to the supply of pulsation energy to batteries and, more particularly, to the supply of pulsation energy to a battery back-up system in a manner that reduces electromagnetic interference.

Batteries have been used to supply electrical energy to various applications, wherein the applications place a load on the batteries. While batteries are commonly used as a primary source of electrical energy, batteries are also commonly used as a source of continuous back-up power, which is commonly referred to as battery back-up. For example, a traditional grid-powered application may include a battery back-up to supply electrical energy to the application in the event of a power failure or other supply interruption affecting the electric grid.

A battery back-up may be configured in various ways depending on the application. As one example, the battery back-up may be an off-line battery back-up, wherein the battery back-up remains idle until a switch is actuated, typically as a result of a failure in the primary power source, thereby transferring the application from the primary power source to the battery back-up. As a second example, the battery back-up may be an on-line battery back-up, wherein the battery back-up continuously powers the application from its energy reserves, while simultaneously replenishing the reserves from the primary power source.

As a battery is discharged, various electro-chemical reactions occur within the battery that result in the accumulation of various deposits, such as lead sulfate deposits, on the battery components (e.g., the battery plates). Batteries are designed to accommodate these deposits, but when these particles increase in size, they cause the charge and discharge cycle to become less efficient. Pulsation devices have been used to counteract the accumulation of large crystal deposits by applying pulsation energy, such as radio frequency energy, to the battery. Without being limited to any particular theory, it is believed that pulsation energy breaks down the accumulated deposits and facilitates ion flow to the active material on the battery plates.

In the telecommunication industry, certain equipment and circuitry is backed-up by large strings of batteries, usually in an on-line battery back-up configuration. However, the use of pulsation energy to restore and maintain healthy operation of the battery strings may cause high levels of electro-magnetic interference ("EMI") to emanate into the sensitive telecommunication equipment/circuitry, thereby causing unacceptable levels of noise. Therefore, to avoid the problems associated with EMI, users may take the battery strings off-line for pulsation reconditioning, thereby greatly increasing maintenance costs, or to avoid higher maintenance costs, users simply replace the battery string which substantially increases capital costs.

Accordingly, there is a need for a battery pulsation system that reduces or perhaps even eliminates EMI in the battery application.

SUMMARY

In one aspect, the disclosed battery pulsation system may include a battery string including a plurality of cells, the battery string defining a positive end and a negative end, a first source of pulsation energy connected to a first cell of the battery string to supply a first pulsation energy thereto, the first cell includes a first positive terminal and a first negative terminal and is generally adjacent to the positive end of the battery string, wherein the first source of pulsation energy applies a greater portion of the first pulsation energy to the first negative terminal than the first positive terminal, and a second source of pulsation energy connected to a second cell of the battery string to supply a second pulsation energy thereto, the second cell includes a second positive terminal and a second negative terminal and is generally adjacent to the negative end of the battery string, wherein the second source of pulsation energy applies a greater portion of the second pulsation energy to the second positive terminal than the second negative terminal.

In another aspect, the disclosed battery pulsation system may include a battery string including a plurality of cells, the battery string defining a positive end cell and a negative end cell, a first pulsation device connected to the positive end cell to supply a first pulsation energy thereto, the positive end cell includes a first positive terminal and a first negative terminal, wherein the first pulsation device applies at least 60 percent of the first pulsation energy to the first negative terminal, and a second pulsation device connected to the negative end cell to supply a second pulsation energy thereto, the negative end cell includes a second positive terminal and a second negative terminal, wherein the second pulsation device applies at least 60 percent of the second pulsation energy to the second positive terminal.

In another aspect, the disclosed battery pulsation system may include a battery string including a plurality of cells, the battery string defining a positive end cell and a negative end cell, a first pulsation device connected to a first cell of the plurality of cells to supply a first pulsation energy thereto, the first cell being at least one cell removed from the positive end cell, the first cell includes a first positive terminal and a first negative, wherein the first pulsation device applies at least 60 percent of the first pulsation energy to the first negative terminal, and a second pulsation device connected to a second cell of the plurality of cells to supply a second pulsation energy thereto, the second cell being at least one cell removed from the negative end cell, the second cell includes a second positive terminal and a second negative terminal, wherein the second pulsation device applies at least 60 percent of the second pulsation energy to the second positive terminal.

Other aspects of the disclosed asymmetric battery pulsation system will become apparent from the following description, the accompanying drawings and the appended claims.

DETAILED DESCRIPTION

Figure 1:
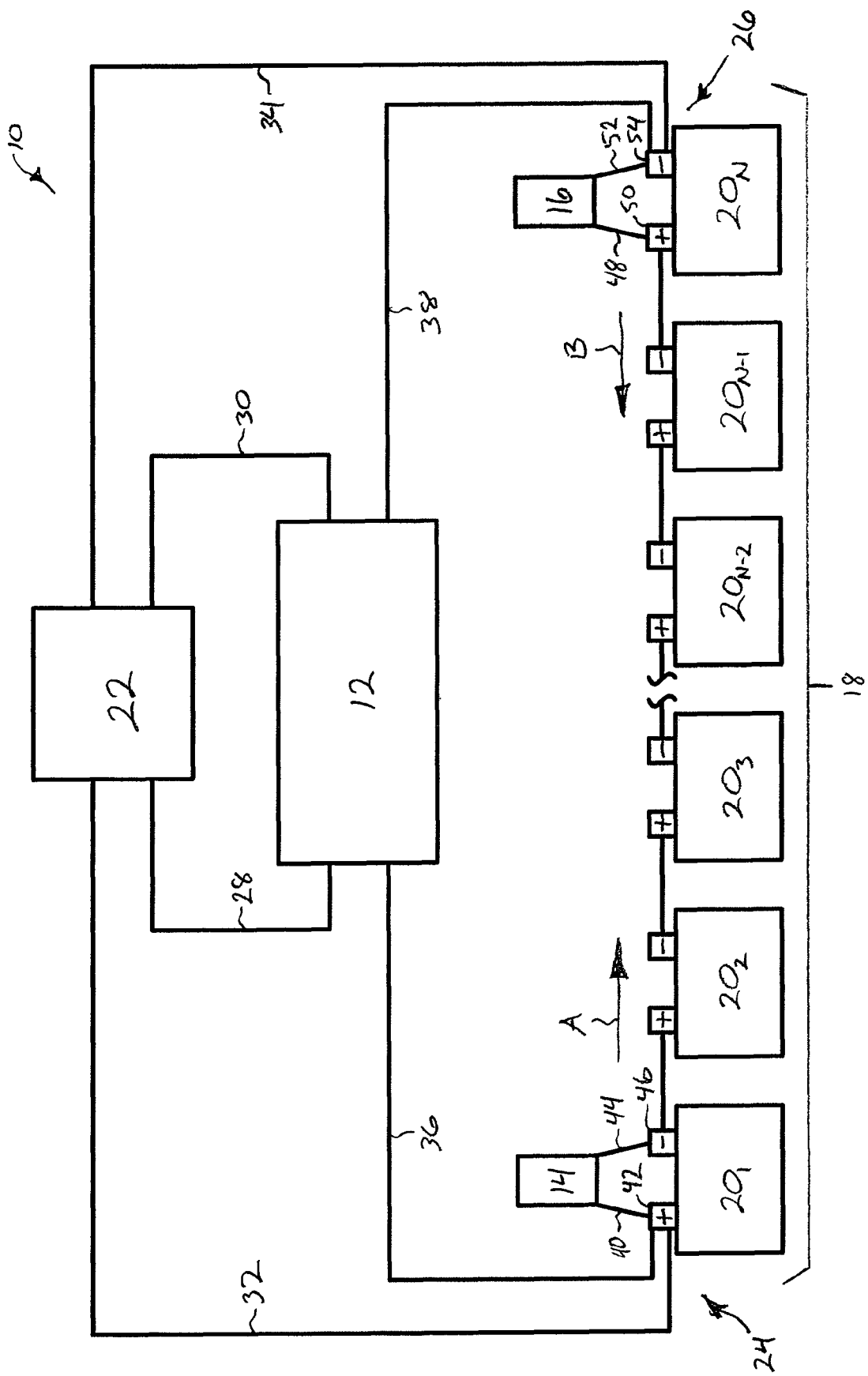
FIG. 1 is a block diagram of a first aspect of the disclosed asymmetric battery pulsation system, wherein the pulsation devices are connected to the positive and negative end cells of the battery string.

Referring to FIG. 1, one aspect of the disclosed asymmetric battery pulsation system, generally designated 10, may be used to service an on-line battery back-up. The system 10 may include a load 12, two sources of pulsation energy (shown as pulsation devices 14, 16), a battery string 18 having a number N of cells $20_1, 20_2, 20_3 \ldots 20_{N-2}, 20_{N-1}, 20_N$, and a primary power supply 22. Each of the cells $20_1, 20_2, 20_3 \ldots 20_{N-2}, 20_{N-1}, 2_N$ of the string 18 may be connected in series to define a positive end 24 and a negative end 26 of the string 18.

The load 12 may be any load 12 that is sensitive to EMI. For example, the load 12 may be the electronics/circuitry of telecommunications equipment. However, those skilled in the art will appreciate that the disclosed system may be used to power any load, regardless of sensitivity to EMI. For example, the load 12 may be a computer processor, a light source (e.g., an incandescent light bulb), a sensor (e.g., a strain gauge) or the like.

The primary power supply 22 may be any appropriate source of electrical energy, such as a supply of alternating current (e.g., an electric grid) or a supply of direct current (e.g., a battery). The primary power supply 22 may be connected to the load 12 by positive 28 and negative 30 lead lines to supply electrical energy thereto. Furthermore, the primary power supply 22 may be connected to the positive 24 and negative 26 ends of the battery string 18 by positive 32 and negative 34 lead lines to supply charging energy thereto.

The cells $20_1, 20_2, 20_3 \ldots 20_{N-2}, 20_{N-1}, 20_N$ of the battery string 18 may be any appropriate electro-chemical cells, particularly rechargeable electro-chemical cells, and may include positive and negative terminals interconnected in series. In one aspect, the cells $20_1, 20_2, 20_3 \ldots 20_{N-2}, 20_{N-1}, 20_N$ of the string 18 may be lead-acid cells, such as flooded lead-acid battery cells. The cells $20_1, 20_2, 20_3 \ldots 20_{N-2}, 20_{N-1}, 20_N$ of the string 18 may have a cell voltage such that the voltage of the string 18 may be calculated by multiplying the number N of cells $20_1, 20_2, 20_3 \ldots 20_{N-2}, 20_{N-1}, 2_N$ in the string 18 by the cell voltage. For example, when the cell voltage is 2 volts and there are 24 cells in the string (i.e., N=20), the string 18 has a voltage of 48 volts.

The battery string 18 may be connected to the load 12 by a positive lead line 36 connected to the positive end 24 of the string 18 and a negative lead line 38 connected to the negative end 26 of the string 18. As the battery string 18 is discharged to the load 12, the primary power source 22 recharges the cells $20_1, 20_2, 20_3 \ldots 20_{N-2}, 20_{N-1}, 20_N$ of the battery string 18. However, when the primary power source 22 is interrupted, such as during a power outage, the battery string 18 continues to supply electrical energy to the load 12.

The sources of pulsation energy (pulsation devices 14, 16) may be pulsation devices or any other appropriate assemblies or apparatus having circuitry or other appropriate components configured to deliver high-frequency voltage and current to the associated battery cells $20_1, 20_2, 20_3 \ldots 20_{N-2}, 20_{N-1}, 20_N$ in pulses. For example, the pulsation devices 14, 16 may deliver voltage and current at a rate of about 10,000 cycles per second. Pulsation devices are available from Canadus Power Systems of Cleveland, Ohio and are described in greater detail in U.S. Pat. No. 5,648,714 to Eryou et al., the entire contents of which are incorporated herein by reference.

While the drawings illustrate two separate pulsation devices 14, 16, those skilled in the art will appreciate that a single pulsation device may be used, wherein the single pulsation device may include circuitry configured to supply a first source of pulsation energy to function as a first pulsation device and a second source of pulsation energy configured to function as a second pulsation device. Furthermore, while the drawings illustrate only two pulsation devices 14, 16, those skilled in the art will appreciate that additional sources of pulsation energy may be used to pulsate additional battery cells $20_1, 20_2, 20_3 \ldots 20_{N-2}, 20_{N-1}, 20_N$ without departing from the scope of the present disclosure.

As shown in FIG. 1, pulsation device 14 may be connected to cell $20_1$ at the positive end 24 of the battery string 18 and pulsation device 16 may be connected to cell $20_N$ at the negative end 26 of the battery string. Pulsation device 14 may include a positive lead line 40 connected to the positive terminal 42 of cell $20_1$ and a negative lead line 44 connected to the negative terminal 46 of cell $20_1$. Pulsation device 16 may include a positive lead line 48 connected to the positive terminal 50 of cell $20_N$ and a negative lead line 52 connected to the negative terminal 54 of cell $20_N$. Alternatively, while not shown in the drawings, the pulsation devices 14, 16 may be integral with the associated battery cells $20_1, 20_N$. Therefore, the pulsation devices 14, 16 may receive the required operating voltage from the associated cells $20_1, 20_N$. For example, when the battery string 18 is operating on 2 volt cells, the pulsation devices should be selected to operate at 2 volts. Of course, those skilled in the art will appreciate that the pulsation devices 14, 16 may be operated by an external power source, rather than the cells $20_1, 20_N$ to which they are connected.

The pulsation device 14 may be configured to supply a greater portion of the pulsation energy to the negative terminal 46 of the cell $20_1$. In other words, the pulsation device 14 may pulsate cell $20_1$, asymmetrically in the sense that the negative terminal 46 receives more pulsation energy than the positive terminal 42 of the cell $20_1$. The pulsation device 16 may be configured to supply a greater portion of the pulsation energy to the positive terminal 50 of the cell $20_N$. In other words, the pulsation device 16 may pulsate cell $20_N$ asymmetrically in the sense that the positive terminal 50 receives more pulsation energy than the negative terminal 54 of the cell $20_1$.

As a first example, pulsation device 14 may be configured to apply 60 percent of the available pulsation energy to the negative terminal 46 of the cell $20_1$, and the remaining 40 percent of the pulsation energy to the positive terminal 42 of the cell $20_1$, while pulsation device 16 may be configured to apply 60 percent of the available pulsation energy to the positive terminal 50 of the cell $20_N$ and the remaining 40 percent of the pulsation energy to the negative terminal 54 of the cell $20_N$. As a second example, pulsation device 14 may be configured to apply 80 percent of the available pulsation energy to the negative terminal 46 of the cell $20_1$, and the remaining 20 percent of the pulsation energy to the positive terminal 42 of the cell $20_1$, while pulsation device 16 may be configured to apply 80 percent of the available pulsation energy to the positive terminal 50 of the cell $20_N$ and the remaining 20 percent of the pulsation energy to the negative terminal 54 of the cell $20_N$. As a third example, pulsation device 14 may be configured to apply 100 percent of the available pulsation energy to the negative terminal 46 of the cell $20_1$, while pulsation device 16 may be configured to apply 100 percent of the available pulsation energy to the positive terminal 50 of the cell $20_N$. At this point, those skilled in the art will appreciate that the extent of the asymmetry is a matter of design and should be selected based upon a proper cost-benefit analysis for a given system.

Thus, the pulsation energy provided by pulsation device 14 may emanate through the string 18 predominately in the direction shown by arrow A, rather than to the load 12 by way of lead line 36, and the pulsation energy provided by pulsation device 16 may emanate through the string 18 predominately in the direction shown by arrow B, rather than to the load 12 by way of lead line 38.

Figure 2:
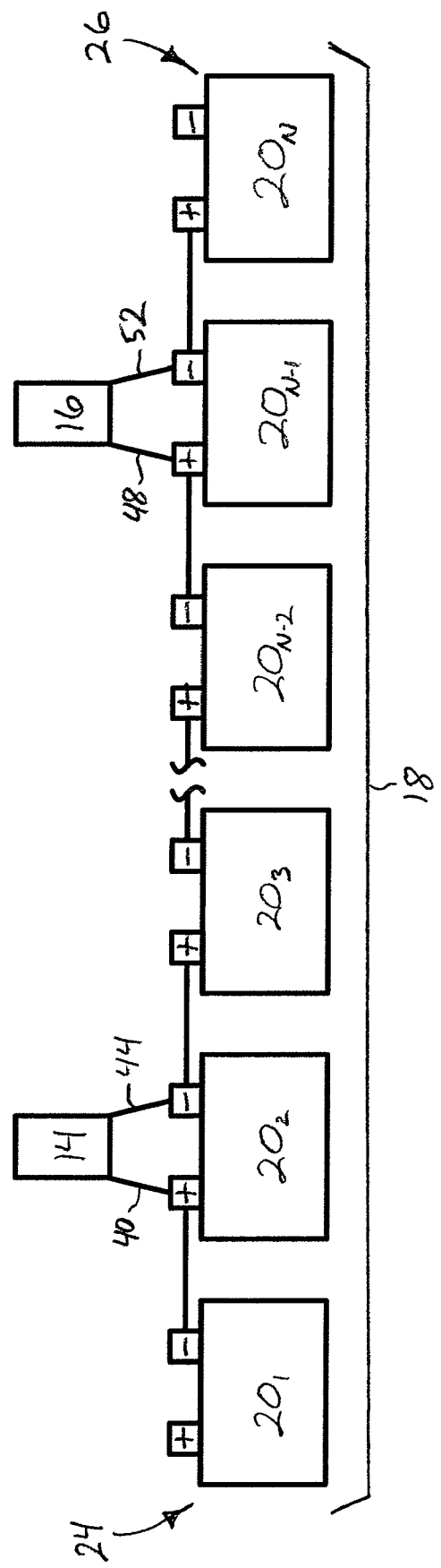
FIG. 2 is a block diagram of the battery string of the system of FIG. 1, wherein the pulsation devices are connected to the battery cells adjacent to the positive and negative end cells of the battery string.

As an alternative option, the pulsation devices 14, 16 may be connected to cells $20_2, 20_3 \ldots 20_{N-2}, 20_{N-1}$ adjacent to, or otherwise internal of, the cells $20_1, 20_N$ at the positive 24 and negative 26 ends of the battery string 18. By doing so, it is believed that the cells external (e.g., cells $20_1$, $20_N$) of the pulsation devices 14, 16, while receiving less pulsation energy from the pulsation devices 14, 16, may act as EMI buffers between the pulsation devices 14, 16 and the load 12. For example, as shown in FIG. 2, pulsation device 14 may be connected to cell $20_2$ and pulsation device 16 may be connected to cell $20_{N-1}$, thereby leaving cells $20_1$, $20_N$ to act as EMI buffers between the pulsation devices 14, 16 and the load 12.

At this point, those skilled in the art will appreciate that the pulsation devices 14, 16 discussed above in connection with FIGS. 1 and 2 were operating independently of each other. In other words, the pulses being supplied by pulsation device 14 were not synchronized with the pulses being supplied by pulsation device 16. In another aspect, the pulsation devices 14, 16 may be synchronized.

Figure 3:
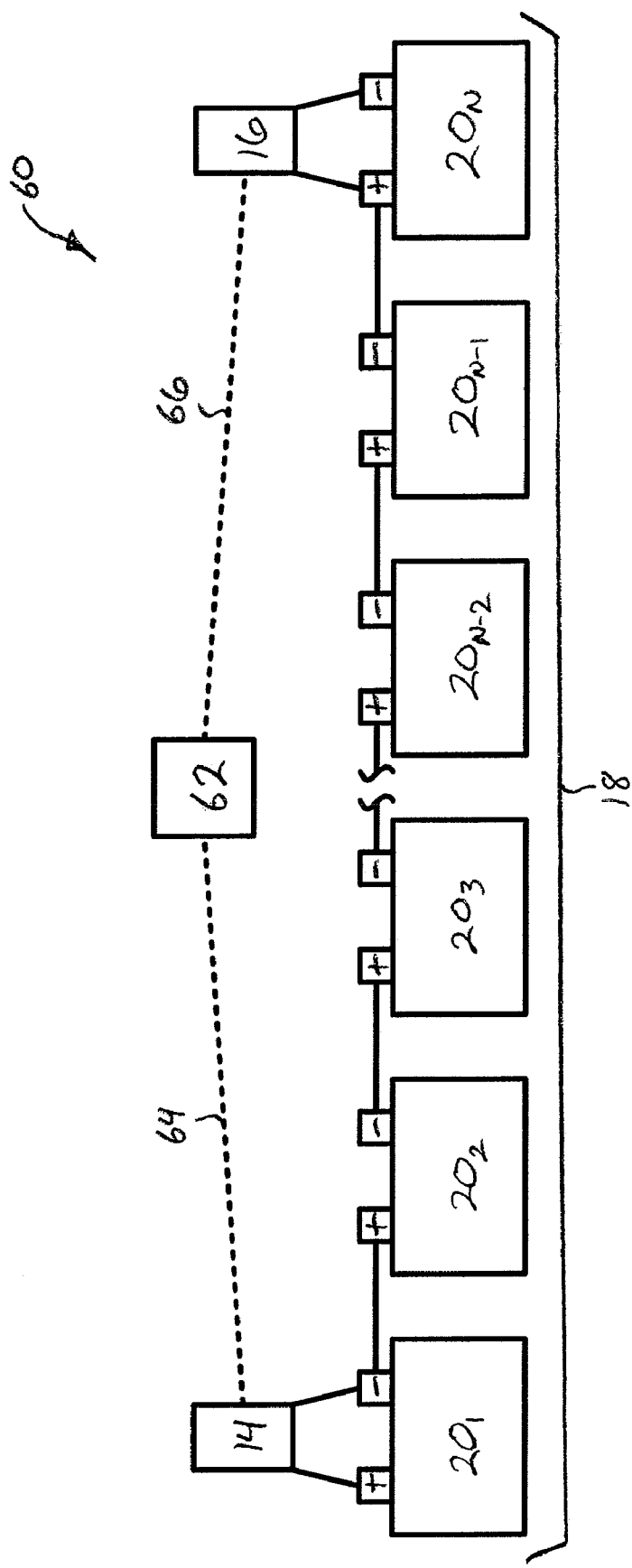
FIG. 3 is a block diagram of a second aspect of the disclosed asymmetric battery pulsation system.

Referring to FIG. 3, in another aspect of the disclosed asymmetric battery pulsation system, generally designated 60, the battery string 18 may include a number N of cells $20_1$, $20_2$, $20_3$ ... $20_{N-2}$, $20_{N-1}$, $20_N$ with pulsation devices 14, 16 connected to cells $20_1$, $20_N$, as described above. A control device 62, such as a computer processor or appropriate electronic control unit, may be in communication with pulsation device 14 by way of communications line 64 and pulsation device 16 by way of communication line 66.

The control device 62 may control the timing of the pulsations generated by the pulsation devices 14, 16. In one example, the control device 62 may communicate signals to the pulsation devices 14, 16 such that the pulsation devices 14, 16 pulse at the same time, which may give rise to destructive interference of the pulsations within the string 18, thereby minimizing EMI in the load 12. In a second example, the control device 62 may communicate signals to the pulsation devices 14, 16 such that the pulses from pulsation device 14 and pulsation device 16 are about 180 degrees apart. Those skilled in the art will appreciate that the synchronization commanded by the control device 62 may vary depending upon the desired result and may be set by the user.

Accordingly, as discussed herein, positioning pulsation devices generally at opposite ends of a battery string and operating the pulsation devices asymmetrically to drive the pulsation energy into the string may minimize or even eliminate EMI in the load, while still providing the cells of the string with the necessary pulsation energy to counteract the damaging electro-chemical reaction deposits formed within the cells.

Although various aspects of the disclosed asymmetric battery pulsation system have been shown and described, modifications may occur to those skilled in the art upon reading the specification. The present application includes such modifications and is limited only by the scope of the claims.

What is claimed is:

1. A battery pulsation system comprising:
   a battery string including a plurality of cells, said battery string defining a positive end and a negative end;
   a first source of pulsation energy connected to a first cell of said plurality of cells to supply a first pulsation energy thereto, said first cell includes a first positive terminal and a first negative terminal and is generally adjacent to said positive end of said battery string, wherein said first source of pulsation energy applies a greater portion of said first pulsation energy to said first negative terminal than said first positive terminal; and
   a second source of pulsation energy connected to a second cell of said plurality of cells to supply a second pulsation energy thereto, said second cell includes a second positive terminal and a second negative terminal and is generally adjacent to said negative end of said battery string, wherein said second source of pulsation energy applies a greater portion of said second pulsation energy to said second positive terminal than said second negative terminal.

2. The system of claim 1 further comprising a load connected to said battery string.

3. The system of claim 1 wherein said plurality of cells are lead-acid battery cells.

4. The system of claim 1 further comprising a primary power supply, said primary power supply being connected to said battery string to supply charging energy thereto.

5. The system of claim 4 wherein said primary power supply and said battery string are connected to a load.

6. The system of claim 1 wherein said first cell is a positive end cell of said battery string.

7. The system of claim 1 wherein said second cell is a negative end cell of said battery string.

8. The system of claim 1 wherein said first cell is at least one cell removed from a positive end cell of said battery string.

9. The system of claim 1 wherein said second cell is at least one cell removed from a negative end cell of said battery string.

10. The system of claim 1 wherein said first source of pulsation energy applies at least about 60 percent of said first pulsation energy to said first negative terminal and said second source of pulsation energy applies at least about 60 percent of said second pulsation energy to said second positive terminal.

11. The system of claim 1 wherein said first source of pulsation energy applies at least about 80 percent of said first pulsation energy to said first negative terminal and said second source of pulsation energy applies at least about 80 percent of said second pulsation energy to said second positive terminal.

12. The system of claim 1 wherein said first source of pulsation energy applies about 100 percent of said first pulsation energy to said first negative terminal and said second source of pulsation energy applies about 100 percent of said second pulsation energy to said second positive terminal.

13. The system of claim 1 wherein said first source of pulsation energy operates independently of said second source of pulsation energy.

14. The system of claim 1 wherein said first source of pulsation energy is synchronized with said second source of pulsation energy.

15. The system of claim 1 wherein said first source of pulsation energy is configured to supply said first pulsation energy at the same time that said second source of pulsation energy supplies said second pulsation energy.

16. The system of claim 1 wherein said first source of pulsation energy is a first pulsation device and said second source of pulsation energy is a second pulsation device.

17. The system of claim 1 wherein said first source of pulsation energy and said second source of pulsation energy are part of a single pulsation device.

18. A battery pulsation system comprising:
   a battery string including a plurality of cells, said plurality of cells including a positive end cell and a negative end cell;
   a first pulsation device connected to said positive end cell to supply a first pulsation energy thereto, said positive end cell includes a first positive terminal and a first negative terminal, wherein said first pulsation device applies at least about 60 percent of said first pulsation energy to said first negative terminal; and a second pulsation device connected to said negative end cell to supply a second pulsation energy thereto, said negative end cell includes a second positive terminal and a second negative terminal, wherein said second pulsation device applies at least about 60 percent of said second pulsation energy to said second positive terminal.

19. The system of claim 18 wherein said first pulsation device applies about 100 percent of said first pulsation energy to said first negative terminal and said second pulsation device applies about 100 percent of said second pulsation energy to said second positive terminal.

20. The system of claim 18 wherein said first pulsation device is synchronized with said second pulsation device.

21. A battery pulsation system comprising:
a battery string including a plurality of cells, said plurality of cells including a positive end cell and a negative end cell;
a first pulsation device connected to a first cell of said plurality of cells to supply a first pulsation energy thereto, said first cell being at least one cell removed from said positive end cell, said first cell includes a first positive terminal and a first negative, wherein said first pulsation device applies at least about 60 percent of said first pulsation energy to said first negative terminal; and
a second pulsation device connected to a second cell of said plurality of cells to supply a second pulsation energy thereto, said second cell being at least one cell removed from said negative end cell, said second cell includes a second positive terminal and a second negative terminal, wherein said second pulsation device applies at least about 60 percent of said second pulsation energy to said second positive terminal.

22. The system of claim 21 wherein said first pulsation device is synchronized with said second pulsation device.

* * * * *